(12) United States Patent
Hayashi

(10) Patent No.: US 11,623,347 B2
(45) Date of Patent: Apr. 11, 2023

(54) AUTONOMOUSLY ACTING ROBOT THAT CHANGES PUPIL IMAGE OF THE AUTONOMOUSLY ACTING ROBOT

(71) Applicant: GROOVE X, Inc., Tokyo (JP)

(72) Inventor: Kaname Hayashi, Tokyo (JP)

(73) Assignee: GROOVE X, INC., Tokyo (JP)

(*) Notice: Subject to any disclaimer, the term of this patent is extended or adjusted under 35 U.S.C. 154(b) by 942 days.

(21) Appl. No.: 16/421,413

(22) Filed: May 23, 2019

(65) Prior Publication Data
US 2019/0279070 A1    Sep. 12, 2019

Related U.S. Application Data

(63) Continuation of application No. PCT/JP2017/041619, filed on Nov. 20, 2017.

(30) Foreign Application Priority Data

Nov. 24, 2016    (JP) .............................. JP2016-227681

(51) Int. Cl.
| | |
|---|---|
| B25J 11/00 | (2006.01) |
| G06V 40/19 | (2022.01) |
| G06V 40/16 | (2022.01) |
| G06N 3/008 | (2023.01) |
| B25J 5/00 | (2006.01) |
| G06T 11/80 | (2006.01) |

(Continued)

(52) U.S. Cl.
CPC ............ *B25J 11/0015* (2013.01); *B25J 5/00* (2013.01); *G06N 3/008* (2013.01); *G06T 7/60* (2013.01); *G06T 11/80* (2013.01); *G06V 40/19* (2022.01); *G06F 3/015* (2013.01); *G06V 40/171* (2022.01)

(58) Field of Classification Search
None
See application file for complete search history.

(56) References Cited

U.S. PATENT DOCUMENTS

| | | |
|---|---|---|
| 6,249,720 B1 | 6/2001 | Kubota et al. |
| 6,565,371 B1 | 5/2003 | Watanabe |

(Continued)

FOREIGN PATENT DOCUMENTS

| | | |
|---|---|---|
| CN | 1649419 A | 8/2005 |
| CN | 101751852 A | 6/2010 |

(Continued)

OTHER PUBLICATIONS

Office Action in JP Application No. 2019-069658, dated Dec. 8, 2021. 8pp.

(Continued)

*Primary Examiner* — Tahmina N Ansari
(74) *Attorney, Agent, or Firm* — Hauptman Ham, LLP

(57) ABSTRACT

A monitor is installed in an eye of a robot, and an eye image is displayed on the monitor. The robot extracts a feature quantity of an eye of a user from a filmed image of the user. The feature quantity of the eye of the user is reflected in the eye image. For example, a feature quantity is a size of a pupillary region and a pupil image, and a form of an eyelid image. Also, a blinking frequency or the like may also be reflected as a feature quantity. Familiarity with respect to each user is set, and which user's feature quantity is to be reflected may be determined in accordance with the familiarity.

15 Claims, 11 Drawing Sheets

(51) Int. Cl.
*G06T 7/60* (2017.01)
*G06F 3/01* (2006.01)

(56) References Cited

U.S. PATENT DOCUMENTS

| | | | | |
|---|---|---|---|---|
| 10,733,992 | B2* | 8/2020 | Funazukuri | B25J 11/001 |
| 10,762,414 | B1* | 9/2020 | Marggraff | G06N 3/008 |
| 2001/0001318 | A1 | 5/2001 | Kamiya et al. | |
| 2004/0137068 | A1 | 7/2004 | Bhushan | |
| 2005/0162511 | A1 | 7/2005 | Jackson | |
| 2013/0040530 | A1 | 2/2013 | Matsuno | |
| 2015/0298315 | A1* | 10/2015 | Shick | G06N 3/008 |
| | | | | 704/260 |
| 2016/0042648 | A1* | 2/2016 | Kothuri | A63F 13/92 |
| | | | | 434/236 |
| 2016/0070955 | A1 | 3/2016 | Kato et al. | |
| 2018/0001483 | A1* | 1/2018 | Song | G06Q 10/101 |
| 2019/0054627 | A1* | 2/2019 | Gomes | B25J 9/0021 |

FOREIGN PATENT DOCUMENTS

| | | |
|---|---|---|
| CN | 105405157 A | 3/2016 |
| CN | 105459126 A | 4/2016 |
| CN | 105835071 A | 8/2016 |
| JP | H10-289006 A | 10/1998 |
| JP | 2000222378 A | 8/2000 |
| JP | 2000-323219 A | 11/2000 |
| JP | 2001-215940 A | 8/2001 |
| JP | 2002-330365 A | 11/2002 |
| JP | 2005242566 A | 9/2005 |
| JP | 2005-313886 A | 11/2005 |
| JP | 2006-106950 A | 4/2006 |
| JP | 2006514696 A | 5/2006 |
| JP | 201339207 A | 2/2013 |
| JP | 2016-57775 A | 4/2016 |

OTHER PUBLICATIONS

Nishiyama et al. "Communication Agent Embedded in Humaroid Robot", Information Processing Society of Japan, Mar. 25, 2003. p. 5-447-5-450. 6pp.
Office Action in DE Application No. 112017005954.2, dated Feb. 8, 2022. 14pp.
International Search Report in PCT/JP2017/041619, dated Jan. 23, 2018. 4pp.
Office Action in JP Application No. 2018-552083, dated Dec. 25, 2018. 8pp.
Vitor F. Pamplona et al, "Photorealistic Models for Pupil Light Reflex and Iridal Pattern Deformation" ACM Transactions on Graphics, Aug. 2009, pp. 1-20, vol. 28, No. 4, Article 106, 20pp.
Asami Takayama et al., "Realization of eyes using Computer Graphics and Sensors", Visual Computing Graphics and CAD Joint Symposium 2005 Proceedings, Jun. 16, 2005, pp. 197-202, 7pp.
"Does people agree because they look alike? Do they look alike because they agree? Face of Art", [online], Dec. 8, 2015, [Searched on Dec. 13, 2018], Internet URL:https://wired.jp/2015/12/08/face-melding-art-project/, 9pp.
Written Opinion of the ISA in PCT/JP2017/041619, dated Jan. 23, 2018. 12pp.
Office Action in CN Application No. 201780072408.1, dated Oct. 28, 2022. 21pp.

* cited by examiner

AUTONOMOUSLY ACTING ROBOT THAT CHANGES PUPIL IMAGE OF THE AUTONOMOUSLY ACTING ROBOT

RELATED APPLICATIONS

The present application is a continuation of International Application No. PCT/JP2017/041619, filed Nov. 20, 2017, which claims priority from Japanese Application No. 2016-227681, filed Nov. 24, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A human keeps a pet in a quest for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to Patent Document 1). Although robot technology has advanced swiftly in recent years, the technology has not advanced so far as to realize a presence as a pet-like companion.

CITATION LIST

Patent Literature

Patent Document 1: JP-A-2000-323219

Non-Patent Literature

Non-patent Document 1: VITOR F. PAMPLONA, MANUEL M. OLIVEIRA and GLADIMIR V. G. BARA-NOSKI, "Photorealistic Models for Pupil Light Reflex and Iridal Pattern Deformation" ACM Transactions on Graphics, Vol. 28, No. 4, Article 106, August 2009

SUMMARY OF INVENTION

Technical Problem

It is commonly said that "a pet looks like its master". As a human has a trait of feeling attachment to something he or she is accustomed to seeing, it may be that a human subconsciously chooses a pet that resembles him or her. Also, a pet changes in appearance and facial expression as it grows in size and increases in age. Of the appearance and facial expression, eyes are particularly important portions when representing an expression, individuality, maturity, and the like. The inventor believes that empathy toward a robot can be greatly increased by strengthening a power of expression of the robot's eyes.

The invention, having been completed based on the heretofore described focus of the inventor, has a main object of providing technology that increases a power of expression of an eye of a robot.

Solution to Problem

An autonomously acting robot in an aspect of the invention includes an operation control unit that selects a motion, a drive mechanism that executes a motion selected by the operation control unit, an eye generating unit that generates an eye image, an eye display unit that causes the eye image to be displayed in a face region of the robot, and a feature extracting unit that extracts a feature quantity of an eye of a user from a filmed image of the user.

The eye generating unit causes the feature quantity of the eye of the user to be reflected in the eye image.

An autonomously acting robot in another aspect of the invention includes an operation control unit that selects a motion, a drive mechanism that executes a motion selected by the operation control unit, an eye generating unit that generates an eye image, and an eye display unit that causes the eye image to be displayed in a face region of the robot.

The eye generating unit causes an aging change of the eye image.

An autonomously acting robot in another aspect of the invention includes an operation control unit that selects a motion, a drive mechanism that executes a motion selected by the operation control unit, an eye generating unit that generates an eye image, an eye display unit that causes the eye image to be displayed in a face region of the robot, and a light detecting unit that detects an external light source.

The eye generating unit causes a catch light to be included in the eye image, and causes a position of the catch light to change in accordance with a direction of the external light source.

An autonomously acting robot in another aspect of the invention includes an operation control unit that selects a motion, a drive mechanism that executes a motion selected by the operation control unit, an eye generating unit that generates an eye image, an eye display unit that causes the eye image to be displayed in a face region of the robot, and a light detecting unit that detects an external light.

The eye generating unit causes a size of a pupil image included in the eye image to change in accordance with an intensity of the external light.

An autonomously acting robot in another aspect of the invention includes a camera, an operation control unit that selects a motion, a drive mechanism that executes a motion selected by the operation control unit, an eye generating unit that generates an eye image, and an eye display unit that causes the eye image to be displayed in a face region of the robot.

The eye generating unit causes a subject image filmed by the camera to be superimposed on the eye image.

An autonomously acting robot in another aspect of the invention includes an operation control unit that selects a motion, a drive mechanism that executes a motion selected by the operation control unit, an eye generating unit that generates an eye image, an eye display unit that causes the eye image to be displayed in a face region of the robot, a sight line detecting unit that detects a sight line of a user, and an icon storage unit that stores an icon correlated to a display condition.

When a display condition of any icon is satisfied and a sight line toward the robot is detected, the eye generating unit superimposes the icon on the eye image.

An autonomously acting robot in another aspect of the invention includes an operation control unit that selects a motion, a drive mechanism that executes a motion selected by the operation control unit, an eye generating unit that generates an eye image, an eye display unit that causes the eye image to be displayed in a face region of the robot, and an icon storage unit that stores an icon correlated to a display condition.

When a display condition of any icon is satisfied, the eye generating unit superimposes the icon on the eye image at a timing of executing a blinking of the eye image.

Advantageous Effects of Invention

According to the invention, a power of expression of an eye of a robot is easily increased.

DESCRIPTION OF EMBODIMENTS

Figure 1A:
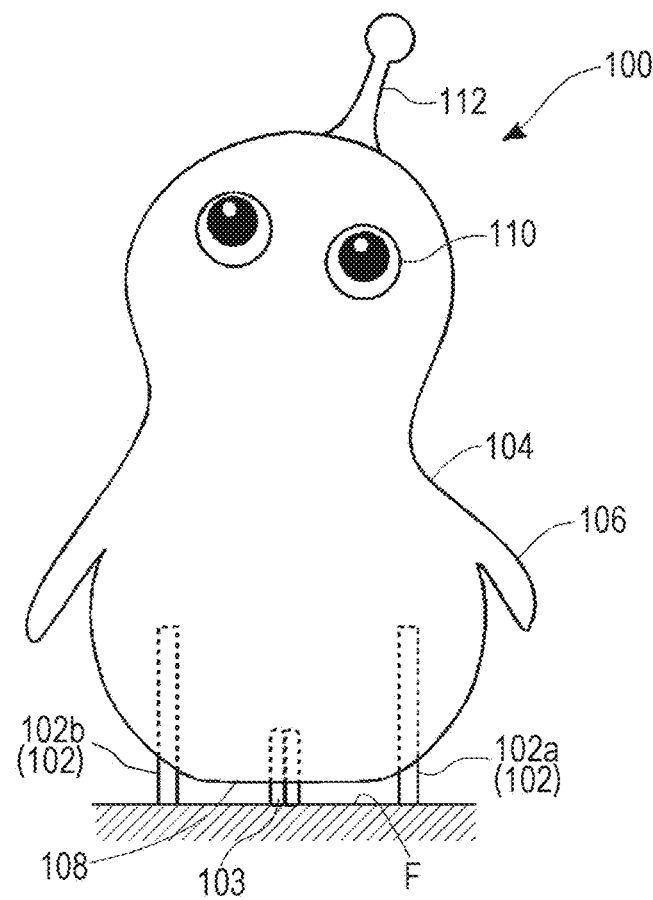
FIG. 1A is a front external view of a robot.
Figure 1B:
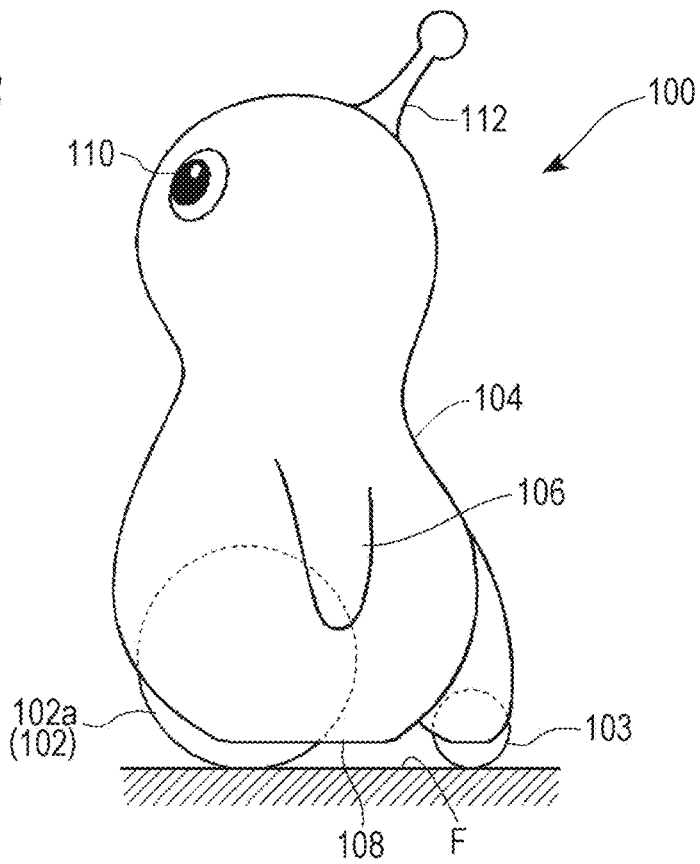
FIG. 1B is a side external view of the robot.

FIG. 1A is a front external view of a robot 100. FIG. 1B is a side external view of the robot 100.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

In principle, the robot 100 has an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

An eye 110 is capable of an image display using a liquid crystal element or an organic EL element. Various sensors, such as a microphone array or an ultrasonic sensor that can identify a direction of a sound source, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112. An omnidirectional camera is attached to the horn 112, and can film a whole of a region above the robot 100 at one time.

Figure 2:
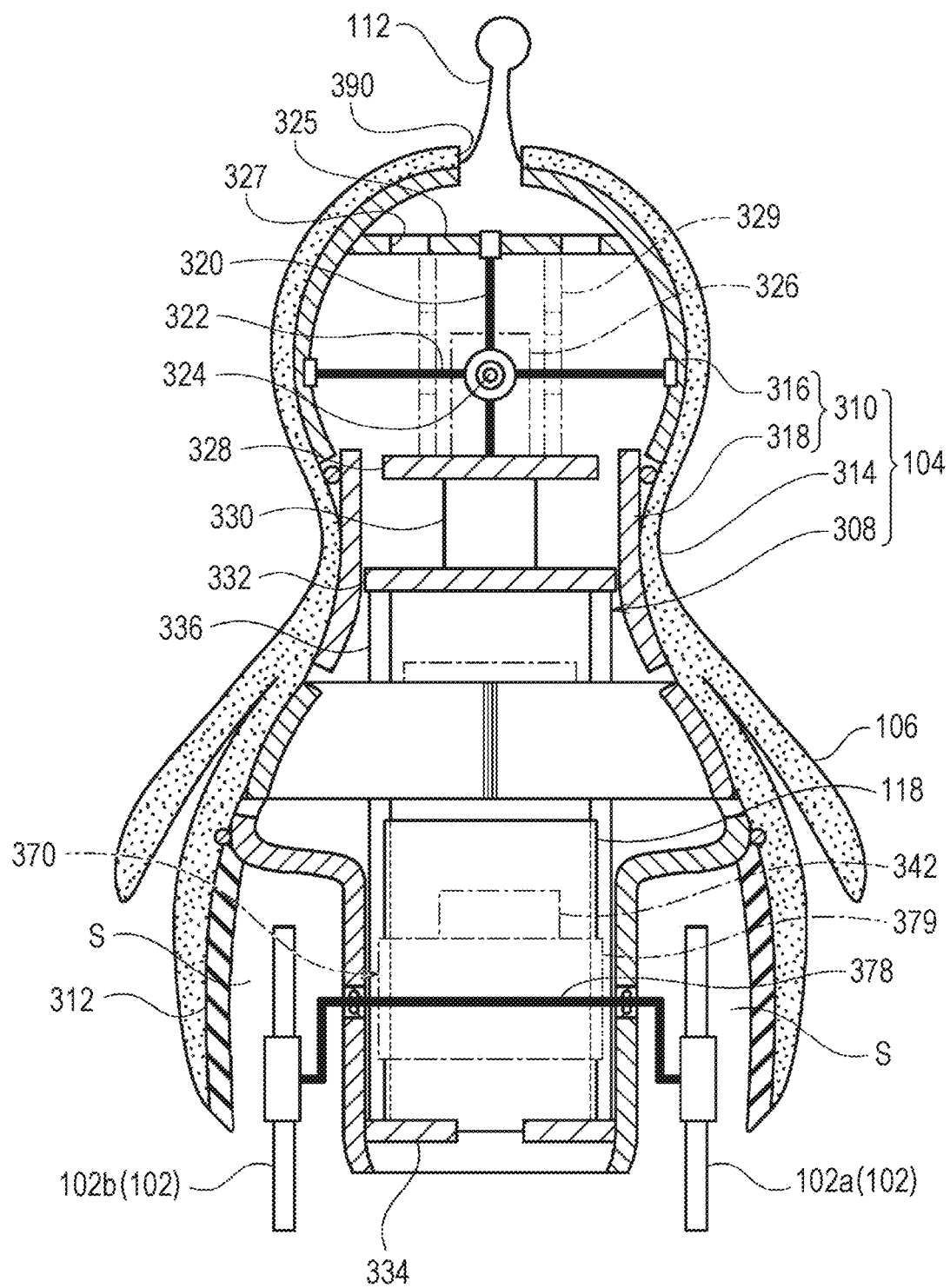
FIG. 2 is a sectional view schematically representing a structure of the robot.

FIG. 2 is a sectional view schematically representing a structure of the robot 100.

As shown in FIG. 2, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 3:
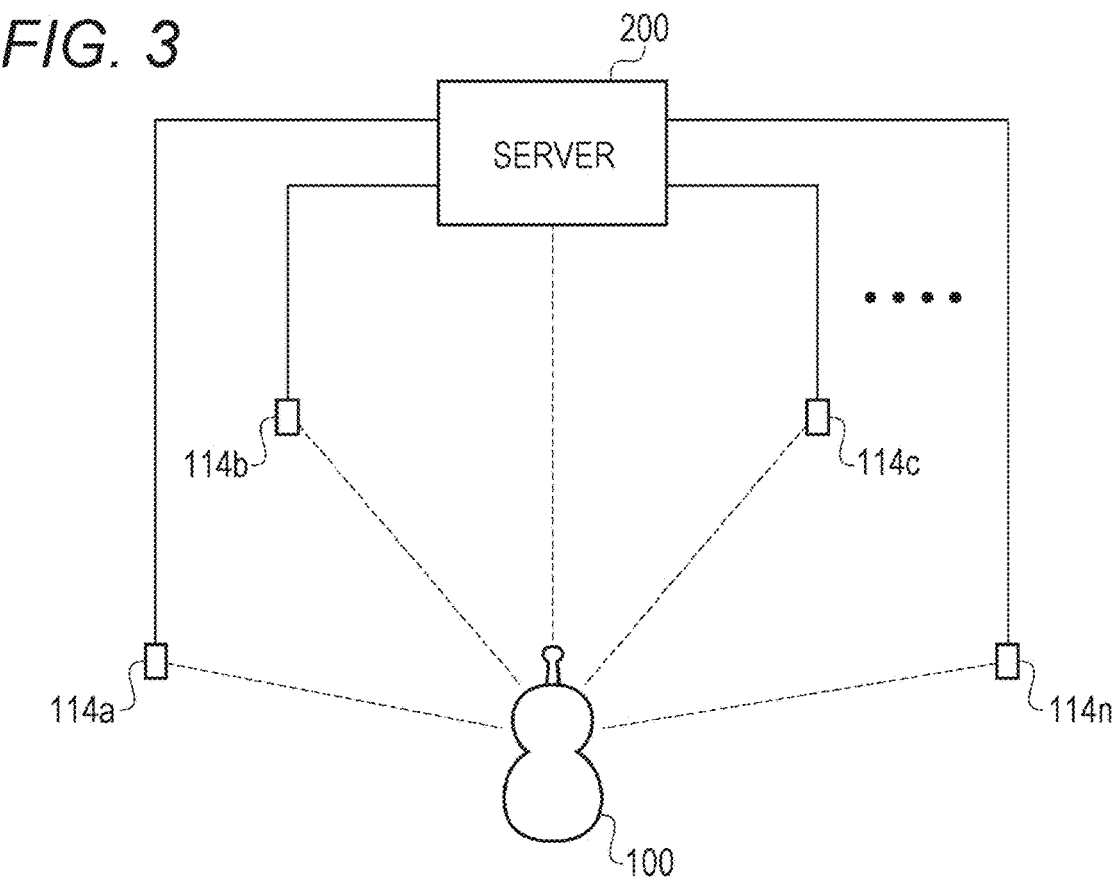
FIG. 3 is a configuration diagram of a robot system.

FIG. 3 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment normally correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 4:
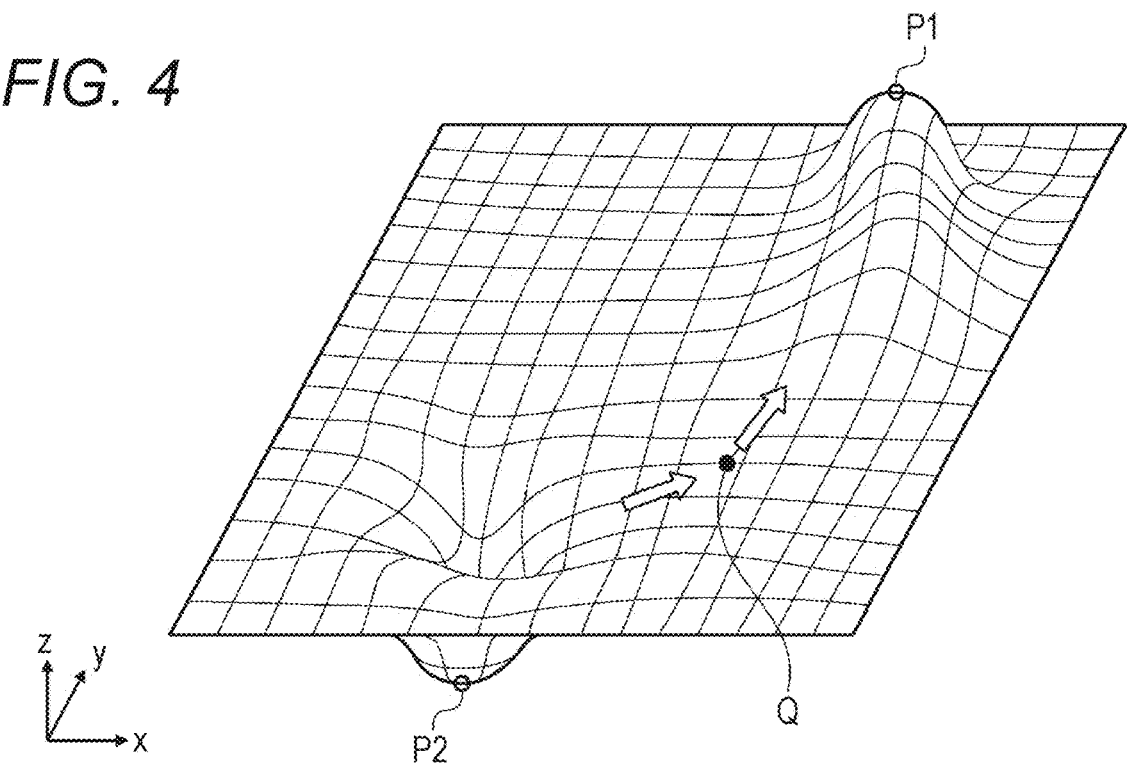
FIG. 4 is a schematic view of an emotion map.

FIG. 4 is a schematic view of an emotion map 116.

The emotion map 116 is a data table stored in the server 200. The robot 100 selects an action in accordance with the emotion map 116. The emotion map 116 shown in FIG. 4 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 4, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 4 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 4. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

In addition to an action map, the robot 100 has parameters that indicate a magnitude of various emotions or senses. For example, when a value of a loneliness emotion parameter is increasing, a weighting coefficient of an action map that evaluates places in which the robot 100 feels at ease is set high, and the value of this emotion parameter is reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 5:
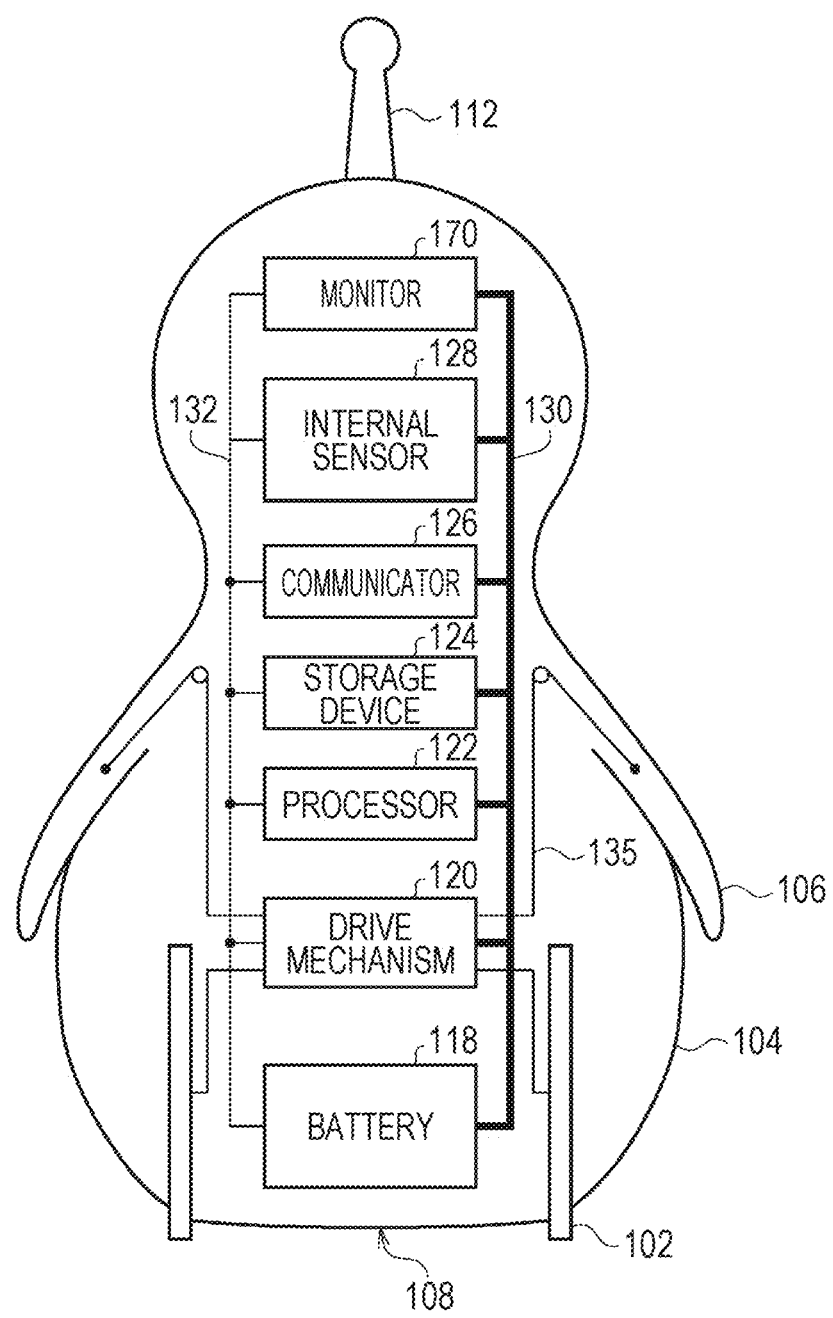
FIG. 5 is a hardware configuration diagram of the robot.

FIG. 5 is a hardware configuration diagram of the robot 100.

The robot 100 includes a monitor 170, an internal sensor 128, a communicator 126, a storage device 124, a processor 122, a drive mechanism 120, and a battery 118. The drive mechanism 120 includes the wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The monitor 170 is installed in the eye 110 of the robot 100, and causes an eye image to be displayed (to be described hereafter).

The internal sensor 128 is a collection of various kinds of sensor incorporated in the robot 100. Specifically, the internal sensor 128 is a camera (omnidirectional camera), a microphone array, a distance sensor (infrared sensor), a thermosensor, a touch sensor, an acceleration sensor, a smell sensor, a touch sensor, and the like. The touch sensor is installed between the outer skin 314 and the main body frame 310, and detects a touch by a user. The smell sensor is an already-known sensor that applies a principle such that electrical resistance changes in accordance with an adsorption of molecules that form a source of a smell. The smell sensor classifies various smells into multiple kinds of category.

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel (the front wheel 102) and the head portion (the head portion frame 316). The drive mechanism 120 changes a direction of movement and a movement speed of the robot 100 by changing the rotational speed and the direction of rotation of each of the two wheels 102. Also, the drive mechanism 120 can also raise and lower the wheels (the front wheel 102 and the rear wheel 103). When the wheels rise, the wheels are completely stored in the body 104, and the robot 100 comes into contact with the floor surface F via the seating face 108, taking on the sitting state. Also, the drive mechanism 120 controls the arm 106 via a wire 135.

Figure 6:
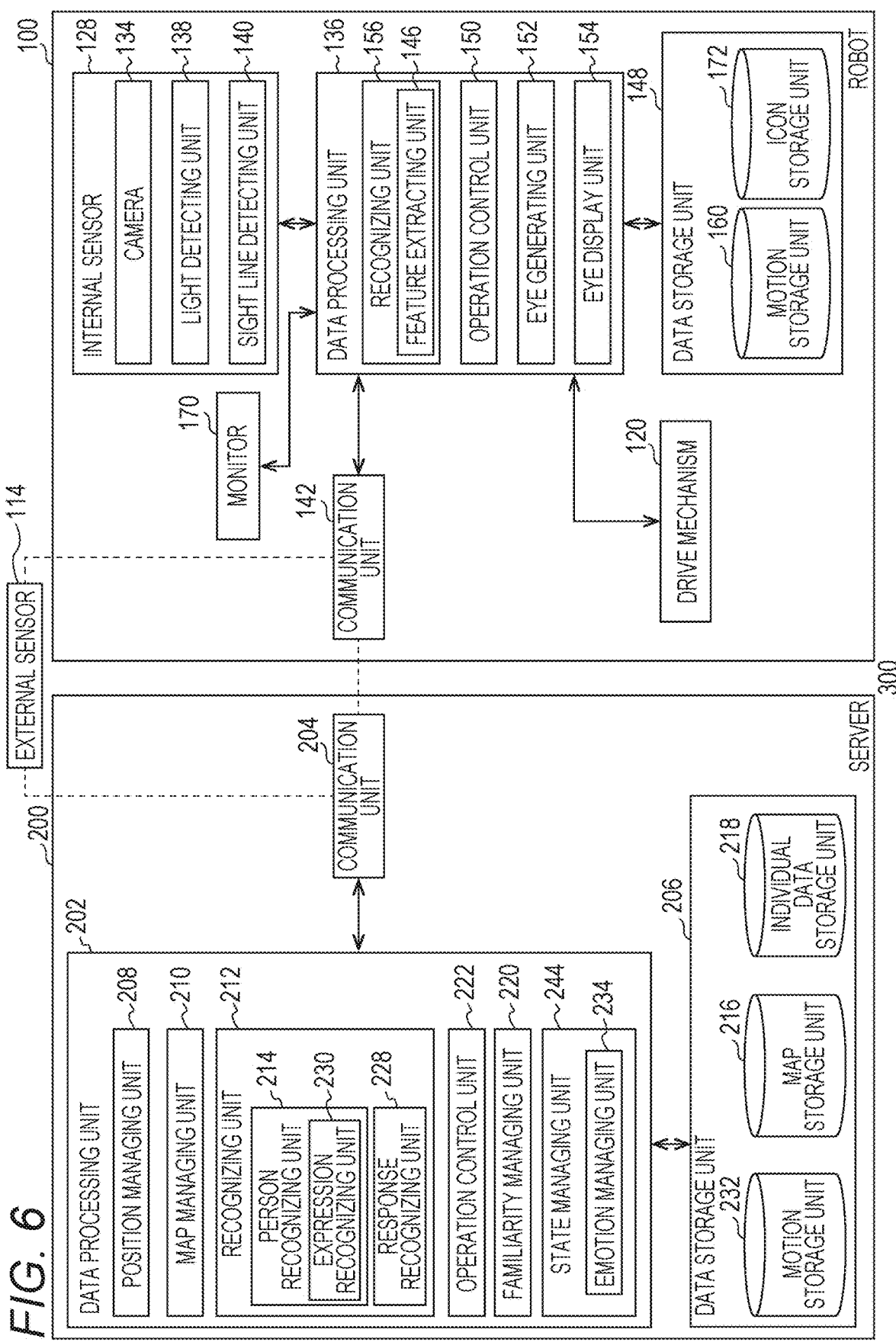
FIG. 6 is a functional block diagram of the robot system.

FIG. 6 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218.

The robot 100 has a multiple of operation patterns (motions). Various motions, such as waving the arm 106, approaching an owner while winding, and watching an owner closely with the head tilted, are defined.

The motion storage unit 232 stores control details of a motion (a motion file). Each motion is identified by motion ID. The motion file is also downloaded into a motion storage unit 160 of the robot 100. Which motion is to be executed may be determined in the server 200, or may be determined in the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time for changing from a preceding unit motion to a subsequent unit motion is called an "interval". It is sufficient that an interval is defined in accordance with time needed for a unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a motion selection probability, a motion file, and the like.

In addition to a motion file, the motion storage unit 232 stores a motion selection table that defines motions that should be executed when various kinds of event occur. One or more motions, and selection probabilities thereof, are correlated to an event in the motion selection table.

In addition to a multiple of action maps, the map storage unit 216 also stores a map showing a disposition situation of an obstacle such as a chair or a table. The individual data storage unit 218 stores information on a user, and in particular, on an owner. Specifically, the individual data storage unit 218 stores master information indicating familiarity toward a user, physical characteristics, and behavioral characteristics. The individual data storage unit 218 may also store attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, a familiarity managing unit 220, and a state managing unit 244.

The position managing unit 208 identifies the positional coordinates of the robot 100 using the method described using FIG. 3. The position managing unit 208 may also track positional coordinates of a user in real time.

The state managing unit 244 manages various kinds of internal parameter such as a charging rate, an internal temperature, and various kinds of physical state such as a processing load of the processor 122. The state managing unit 244 includes an emotion managing unit 234.

The emotion managing unit 234 manages various emotion parameters indicating emotions (loneliness, curiosity, a desire for approval, and the like) of the robot 100. These emotion parameters constantly fluctuate. The importance of the multiple of action maps changes in accordance with the emotion parameters, a movement target point of the robot 100 changes in accordance with the action maps, and the emotion parameters change in accordance with movement of the robot 100 and the passing of time.

For example, when the emotion parameter indicating loneliness is high, the emotion managing unit 234 sets the weighting coefficient of the action map that evaluates places in which the robot 100 feels at ease to be high. When the robot 100 reaches a point on the action map at which loneliness can be eliminated, the emotion managing unit 234 reduces the emotion parameter indicating loneliness. Also, each kind of emotion parameter also changes in accordance with a response action to be described hereafter. For example, the emotion parameter indicating loneliness decreases when the robot 100 is "hugged" by an owner, and the emotion parameter indicating loneliness increases little by little when the robot 100 does not visually recognize an owner for a long time.

The map managing unit 210 changes the parameter of each coordinate on the multiple of action maps using the method described in connection with FIG. 4. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 156 of the robot 100 acquires various kinds of environmental information using the internal sensor 128, and after carrying out a primary processing of the environmental information, transfers the environmental information to the recognizing unit 212 of the server 200.

Specifically, the recognizing unit 156 of the robot 100 extracts an image region corresponding to a moving object, particularly a person or an animal, from an image, and extracts a "feature vector" as a collection of feature quantities indicating physical characteristics and behavioral characteristics of the moving object from the extracted image region. A feature vector component (feature quantity) is a numeral wherein various kinds of physical and behavioral characteristic are quantified. For example, a horizontal width of a human eye is quantified in a range of 0 to 1, forming one feature vector component. Already-known facial recognition technology is applied as a method of extracting a feature vector from a filmed image of a person. The robot 100 transmits the feature vector to the server 200.

The recognizing unit 212 of the server 200 further includes a person recognizing unit 214 and a response recognizing unit 228.

The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user.

The person recognizing unit 214 also carries out a user recognition process on a moving object other than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The movement control unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed at a probability of 20% when a pleasant action is performed by an owner, and a motion B is executed at a probability of 5% when an air temperature is 30 degrees or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that owner. When an unpleasant action is detected, the familiarity managing unit 220 reduces familiarity. Also, familiarity of an owner not visually recognized for a long period gradually decreases.

Robot 100

The robot 100 includes a communication unit 142, a data processing unit 136, a data storage unit 148, the internal sensor 128, the monitor 170, and the drive mechanism 120.

The communication unit 142 corresponds to the communicator 126 (refer to FIG. 5), and manages a process of communicating with the external sensor 114, the server 200, and another robot 100. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes a motion storage unit 160, which defines various kinds of motion of the robot 100, and an icon storage unit 172.

Various kinds of motion file are downloaded from the motion storage unit 232 of the server 200 into the motion storage unit 160 of the robot 100. A motion is identified by motion ID. An operating timing, an operating time, an operating direction, and the like, of the various kinds of actuator (the drive mechanism 120) are defined chronologically in the motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

Various kinds of data may also be downloaded from the map storage unit 216 and the individual data storage unit 218 into the data storage unit 148.

The icon storage unit 172 stores icon information wherein an icon image and display conditions thereof are correlated. An icon provides various kinds of information to a user by being displayed in the eye 110 of the robot, as described hereafter. For example, the communication unit 142 of the robot 100 acquires weather information from an external site via the Internet. When it is raining, or when rain is expected within a few hours, an icon representing an umbrella is displayed in the eye 110 (to be described in detail hereafter). In this case, the display conditions of the umbrella icon are "when it is raining, or when rain is expected within a few hours". In addition to this, various icons are stored in the icon storage unit 172. When an air cleanliness sensor is mounted in the robot 100, an icon may be displayed in accordance with air cleanliness or a chemical substance content. Specifically, when a carbon dioxide concentration or a concentration of airborne particulates reaches a predetermined value or higher, an icon indicating the matter may be displayed. In addition to this, various icons can be displayed in accordance with a room temperature, the internal temperature of the robot 100, the charging rate of the battery 118, the existence or otherwise of a failure, and an emotional state managed by the emotion managing unit 234.

The internal sensor 128 includes a camera 134, a light detecting unit 138, and a sight line detecting unit 140. The camera 134 in this embodiment is an omnidirectional camera attached to the horn 112. The light detecting unit 138 is a light sensor, and detects a direction of an external light source, a light color, and an amount of light. The sight line detecting unit 140 is an already-known sensor that detects eye movement of a user from an image filmed by the camera 134. In the embodiment, a gaze of a user toward the robot 100 is detected by the sight line detecting unit 140.

The data processing unit 136 includes the recognizing unit 156, a movement control unit 150, an eye generating unit 152, and an eye display unit 154.

The operation control unit 150 of the robot 100 determines a motion of the robot 100 in cooperation with the operation control unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion determined by the robot 100. It is sufficient that a way in which a motion determining process is divided between the server 200 and the robot 100 is designed in accordance with the specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by repeatedly causing the left and right front wheels 102 to alternately rotate in reverse and stop in a housed state when bored of the "hug". The drive mechanism 120 causes the robot 100 to perform various motions by driving the front wheel 102, the arm 106, and the neck (head port ion frame 316) in accordance with an instruction from the operation control unit 150.

The eye generating unit 152 generates an eye image. The eye generating unit 152 individually controls two eye images corresponding to the two eyes 110. The eye display unit 154 causes an eye image generated by the eye generating unit 152 to be displayed on the monitor 170 installed in the eye 110. Details of an eye image will be described hereafter.

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the incorporated omnidirectional camera, and detects a moving object such as a person or a pet. The recognizing unit 156 includes a feature extracting unit 146. The feature extracting unit 146 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from the smell sensor, an incorporated highly directional microphone, a temperature sensor, and the like. For example, when a moving object appears in an image, various characteristics such as having a beard, being active early in the morning, wearing red clothing, smelling of perfume, having a loud voice, wearing spectacles, wearing a skirt, having white hair, being tall, being plump, being suntanned, and being on a sofa, are extracted. These characteristics are also quantified, forming feature vector components.

The robot system 300 clusters users appearing with a high frequency as "owners" based on physical characteristics and behavioral characteristics obtained from a large amount of image information or other sensing information.

For example, when a moving object (user) having a beard is often active in the early morning (gets up early) and rarely wears red clothing, a first profile of a cluster (user) that gets up early, has a beard, and does not often wear red clothing is created. Meanwhile, when a moving object wearing spectacles often wears a skirt but the moving object does not have a beard, a second profile of a cluster (user) that wears spectacles and wears a skirt but definitely does not have a beard is created.

Although the above is a simple example, the first profile, corresponding to a father, and the second profile, corresponding to a mother, are formed using the heretofore described method, and the robot 100 recognizes that there are at least two users (owners) in the house.

Note that the robot 100 does not need to recognize that the first profile is the "father". It is always sufficient that the robot 100 can recognize a personal profile that is a "cluster that has a beard, often gets up early, and hardly ever wears red clothing". A feature vector in which the profile is characterized is defined for each profile.

It is assumed that the robot 100 newly recognizes a moving object (user) in a state wherein this kind of cluster analysis is completed.

At this time, the person recognizing unit 214 of the server 200 executes a user identification process based on the feature vector of the new moving object, and determines what profile (cluster) the moving object corresponds to. For example, when a moving object having a beard is detected, the probability that the moving object is the father is high. When the moving object is active early in the morning, it is even more certain that the moving object corresponds to the father. Meanwhile, when a moving object wearing spectacles is detected, there is a possibility that the moving object is the mother. When the moving object has a beard, the moving object is neither the mother nor the father, because of which the person recognizing unit 214 determines that the moving object is a new person who has not been cluster analyzed.

Formation (cluster analysis) of a cluster (profile) by feature extraction and matching with a cluster in accompaniment to feature extraction may be executed concurrently.

Of a series of recognition processes including detecting, analyzing, and determining, the recognizing unit 156 of the robot 100 carries out a selection and extraction of information necessary for recognition, and an analyzing process such as determining is executed by the recognizing unit 212 of the server 200. The recognition processes may be carried out by the recognizing unit 212 of the server 200 alone, or carried out by the recognizing unit 156 of the robot 100 alone, or the two may execute the recognition processes while dividing roles as heretofore described.

When a strong force is applied to the robot 100, the recognizing unit 156 recognizes this using the incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 recognizes that a "touching action" has been performed by a user, and when upward acceleration is detected in a state in which touching is recognized, the response recognizing unit 228 recognizes that a "hug" has been performed. Physical contact when a user picks up the body 104 may also be sensed, and a hug may also be recognized by a load acting on the front wheels 102 decreasing.

To summarize, the robot 100 acquires an action of a user as physical information using the internal sensor 128, the response recognizing unit 228 of the server 200 determines whether the action is pleasant or unpleasant, and the recognizing unit 212 of the server 200 executes a user identification process based on the feature vector.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

Depending on what kind of action the robot 100 is subjected to by a moving object (user), familiarity with respect to the user changes.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A user with extremely high familiarity

The robot 100 strongly expresses a feeling of affection by approaching a user (hereafter called an approaching action), and performing an affectionate gesture defined in advance as a gesture indicating goodwill toward a person.

(2) A user with comparatively high familiarity

The robot 100 carries out only an approaching action.

(3) A user with comparatively low familiarity

The robot 100 does not carry out any special action.

(4) A user with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Figure 7:
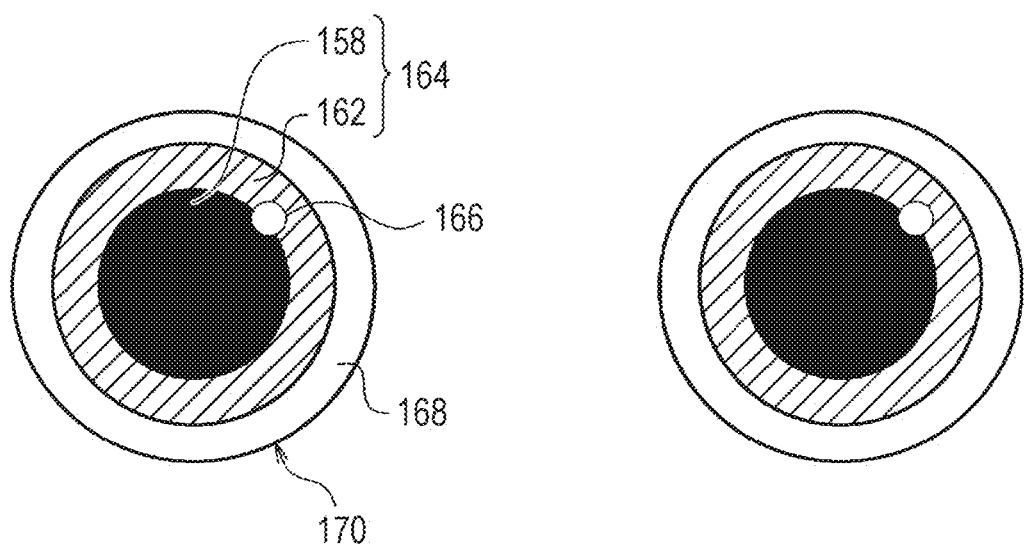
FIG. 7 is an external view of an eye image.

FIG. 7 is an external view of an eye image 174.

The eye generating unit 152 generates the eye image 174, which includes a pupil image 164 and a peripheral edge image 168. The eye generating unit 152 causes the eye image 174 to be displayed as a moving image. Specifically, a sight line of the robot 100 is represented by moving the pupil image 164. Also, a blinking action is executed at a predetermined timing. The eye generating unit 152 performs various movements of the eye image 174 in accordance with various operation patterns. The eye display unit 154 causes the eye image 174 to be displayed on the monitor 170 of the eye 110. The monitor 170 desirably has a curved form, in the same way as a human eyeball. The monitor 170 in the embodiment is described as being of a flat form.

The pupil image 164 includes a pupillary region 158 and a corneal region 162. Also, a catch light 166 for representing a reflection of external light is also displayed in the pupil image 164. Rather than shining owing to a reflection of external light, the catch light 166 of the eye image 174 is an image region represented as a region of high luminance by the eye generating unit 152.

The eye generating unit 152 can cause the pupil image 164 to move vertically and horizontally on the monitor 170. When the recognizing unit 156 of the robot 100 recognizes a moving object, the eye generating unit 152 generates an operation pattern (moving image data) such that the pupil image 164 is directed in the direction in which the moving object exists. The eye display unit 154 represents the "sight line" of the robot 100 by causing the display of the eye image 174 to change in accordance with the operation pattern. As heretofore described, the eye generating unit 152 individually controls eye images 174 displayed in the two eyes 110. When the sight line of the robot 100 is directed toward a target such as a user, the eye generating unit 152 directs both of the two eye images 174 toward the target.

The eye generating unit 152 may cause a form of the pupil image 164 to change in accordance with a position on the monitor 170. Specifically, a perfectly circular form is adopted when the pupil image 164 is in the center of the monitor 170, and the form is changed to an elliptical form when the pupil image 164 is in a peripheral edge portion. By the form of the pupil image 164 being changed in accordance with the position, the monitor 170 can be caused to appear to be of a curved form like an actual eyeball, even in the case of the flat monitor 170. The eye generating unit 152 represents the eye image 174 as a planar image by generating a three-dimensional object resembling an eyeball, and projecting the three-dimensional object onto the monitor 170 (projection surface).

The light detecting unit 138 detects an external light source such as the sun or an electric light. The eye generating unit 152 causes a position of the catch light 166 to change in response to a direction in which the external light source exists. FIG. 7 shows a display position of the catch light 166 when an external light source exists above and to the left as seen from the robot 100. By linking the position of the catch light 166 to an external light source, a more realistic eye image 174 can be represented. Also, distorting the catch light 166 into an elliptical form in accordance with the position of the catch light 166, in the same way as the pupil image 164, is effective in causing the monitor 170 to appear to be of a curved form.

Figure 8:
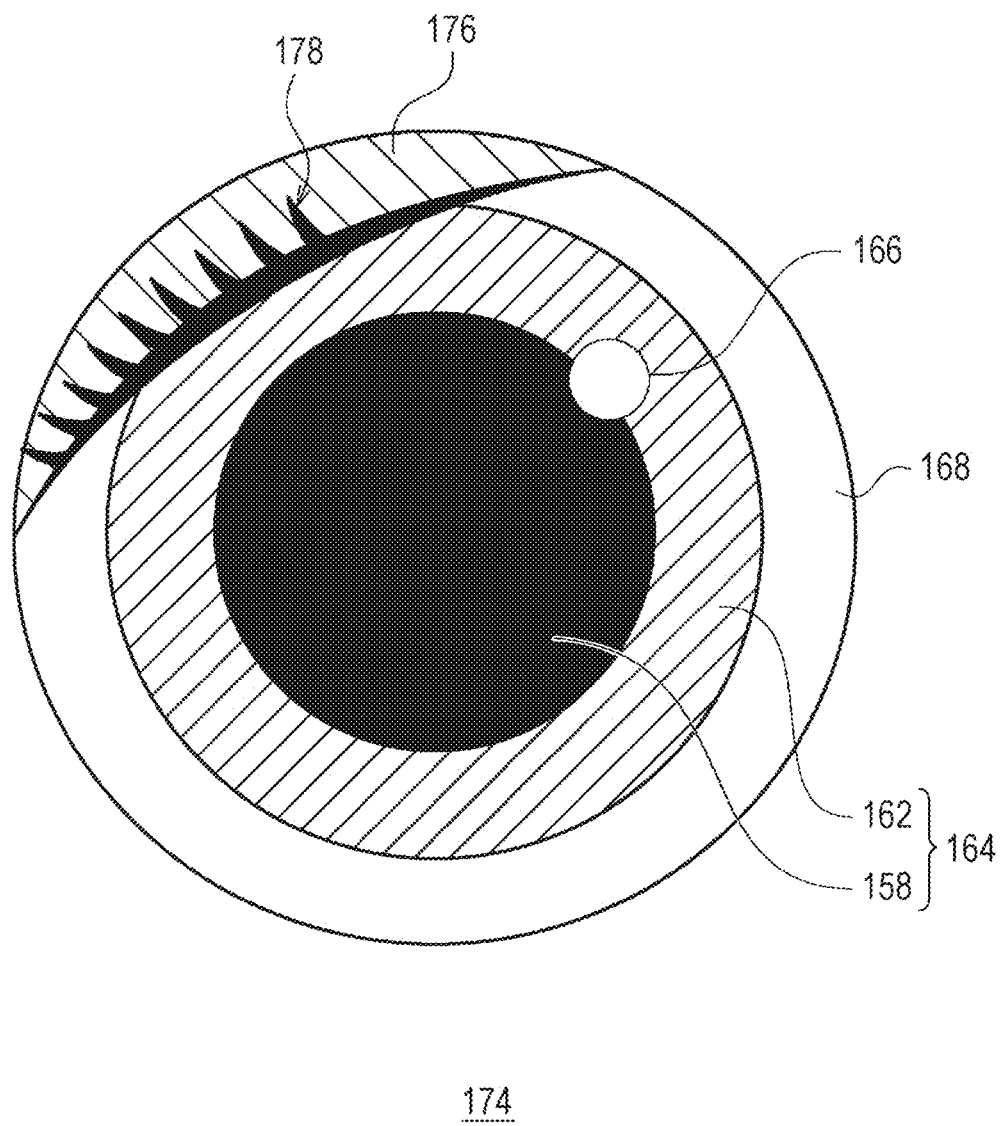
FIG. 8 is an enlarged view of the eye image.

FIG. 8 is an enlarged view of the eye image 174.

The eye image 174 in the embodiment also includes an eyelid image 176 showing an eyelid superimposed on the pupil image 164 and the peripheral edge image 168. The eyelid image 176 includes an eyelash 178. The peripheral edge image 168 is a portion corresponding to a human conjunctiva. The corneal region 162 included in the pupil image 164 is a portion corresponding to a human cornea. An iris may be displayed in the corneal region 162.

Of the eye image 174, the eye generating unit 152 causes the eyelid image 176, the pupillary region 158, the corneal region 162, and the catch light 166 to change. There are two kinds of change of the eye image 174, those being a constant, stable change (hereafter called a "constant change") and a temporary change (hereafter called a "transient change").

Furthermore, there are two kinds of constant change, those being an irreversible change accompanying a passing of time (hereafter called an "aging change") and a change that incorporates features of an owner's eye (hereafter called a "reflective change"). That is, the eye 110 of the robot 100 has a feature of gradually coming to resemble an owner's eye.

(1) Constant Change
(1-1) Aging Change

It is said that the diameter of a human pupil decreases with aging. In accompaniment to an increase in age, the whiteness of a conjunctiva fades, and the muscle strength that closes an eyelid diminishes, because of which the eyelid gradually droops. Also, it is said that the frequency of blinking in infancy is low, and the frequency of blinking stabilizes after reaching adulthood.

The eye generating unit 152 represents change accompanying growth and aging of an eye of a living being, particularly a human, in the eye image 174. The eye generating unit 152 causes the eye image 174 to change gradually in accompaniment to the passing of time from the time the robot 100 is shipped from the factory. Specifically, the eye generating unit 152 reduces a diameter of the corneal region 162 in accompaniment to the passing of time, and causes a fixed position of the eyelid image 176 to descend. After a particularly long time elapses, a setting may be such that the eyelid image 176 does not rise above a predetermined position. Although blinking is represented by the eye generating unit 152 regularly lowering the eyelid image 176, the frequency of blinking also changes in accompaniment to the aging of the robot 100.

(1-2) Reflective Change

An eye is an important region that is liable to leave an impression on another person. The feature extracting unit 146 films an eye of an owner, and extracts features of the eye. Feature extraction is such that features of an external appearance of the eye are extracted as feature quantities by the features being quantified. Not only static features such as a pupil size, but also dynamic features such as a sight line movement habit or blinking frequency, may be included in the external appearance of the eye. More specifically, parameters such as eyelid form and fixed position, how the eyelid descends, eyelash length, and pupil size and color, are extracted as feature quantities of the eye. Dynamic features such as a fixed position of the pupil, a habit of glancing upward or narrowing the eyes, or blinking frequency, also form feature quantities. In the case of a female, eyelash length and the color of the eyelid image 176 may change depending on makeup.

The eye generating unit 152 causes the eye 110 of the robot 100 to resemble an owner by causing the feature quantities of the owner's eye to also be reflected in the eye image 174. In the embodiment, the eye generating unit 152 spends several months to several years causing the features of the owner to be reflected in the eye image 174. For example, when the robot 100 belongs to an owner whose eyelid droops somewhat on an outer eye corner side, the eye generating unit 152 causes the eyelid image 176 of the robot 100 to change so that the outer eye corner side droops.

The eye generating unit 152 causes the eye image 174 to change by adjusting a spline curve that forms a boundary line between various kinds of portion such as the eyelid image 176 and the pupil image 164, or more specifically, by adjusting one or more control points on a spline curve. For example, the eye generating unit 152 causes the form of the eyelid image 176 to change by changing the spline curve forming the boundary between the eyelid image 176 and the pupil image 164. By gradually causing the spline curve control points to change, the look of the eye image 174 can be caused to change little by little over time.

The eye generating unit 152 may prepare image patterns of a multiple of the eye image 174. Further, the look of the eye image 174 may be caused to change by switching among the multiple of eye images 174.

When there are a multiple of owners, the eye generating unit 152 causes the features of the owner with the highest familiarity to be reflected in the eye image 174. When the owner with the highest familiarity changes from an owner P1 to an owner P2, the eye generating unit 152 selects the features of the owner P2 as a new reflective change model.

Owing to the aging change and the reflective change, the robot 100 gradually grows and ages, and comes to resemble an owner. Because of this, the owner can feel a sense of closeness to the robot 100, and can sense the growth and aging of the robot 100. The eye 100 may be caused to constantly change based on only one of the aging change or the reflective change.

(2) Transient Change

A transient change mainly occurs due to external light. Although transient changes due to a display of a "reflection" or an "icon" also occur in the eye image 174, these will be described hereafter. As heretofore described, the eye generating unit 152 causes the position of the catch light 166 to change in response to the direction of an external light. Also, the eye generating unit 152 causes the form, a color, and a size of the catch light 166 to change in accordance with a form and an intensity of an external light source. For example, when the external light source is a window, the eye generating unit 152 causes the catch light 166 to change to the form of the window. When the external light source is blue, the catch light 166 becomes blue. The higher the light intensity, the further the eye generating unit 152 increases the size of the catch light 166. When there are a multiple of light sources, the eye generating unit 152 causes a multiple of catch lights 166 to be displayed.

When a sight line from a user toward the robot 100 is detected, the eye generating unit 152 may increase the size of the catch light 166. The sight line detecting unit 140 determines whether or not a user is gazing at the robot 100 by analyzing a filmed image and detecting a pupillary orientation of the user. Also, a configuration may be such that sight line detection is executed when a size of a face region of the user in the filmed image is of a predetermined value or greater, or on condition that the user is within a predetermined distance according to the distance sensor (not shown).

When the light intensity is high, the eye generating unit 152 increases a diameter of the pupillary region 158. It is sufficient that a relationship between light intensity and pupillary diameter is controlled in accordance with an already-known model (for example, refer to Expression (2) of Non-patent Document 1). When the light intensity is particularly high, an "appearance of seeming dazzled" may be represented by lowering the eyelid image 176.

FIG. 9A to FIG. 9E are external views of various eye images 174. Each drawing corresponds to a right eye.

Figure 9A:
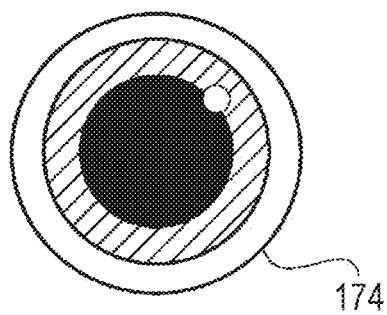
FIG. 9A is the eye image when an eyelid image is not displayed.
Figure 9B:
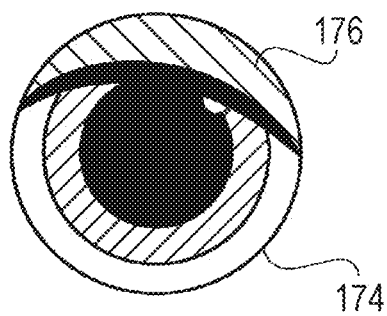
FIG. 9B is the eye image when the eyelid image is drooping on an inner eye corner side.
Figure 9C:
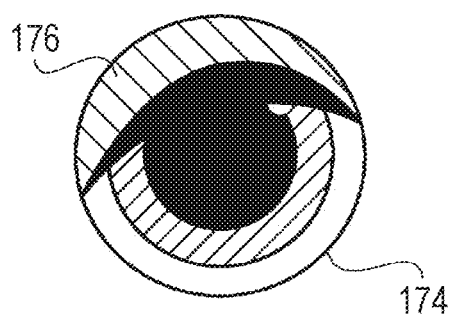
FIG. 9C is a first eye image when the eyelid image is drooping on an outer eye corner side.
Figure 9D:
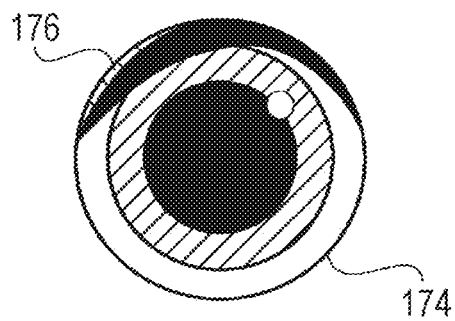
FIG. 9D is a second eye image when the eyelid image is drooping on the outer eye corner side.
Figure 9E:
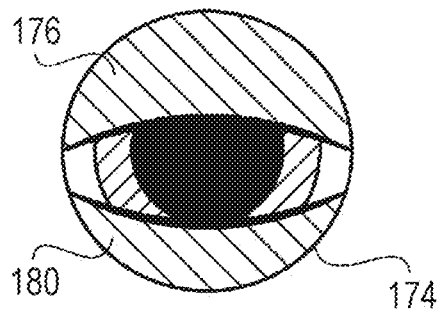
FIG. 9E is the eye image when a lower eyelid is also displayed in addition to the eyelid image.

FIG. 9A is the eye image 174 when the eyelid image 176 is not displayed. FIG. 9B is the eye image 174 when the eyelid image 176 is drooping on an inner eye corner side. FIG. 9C is the eye image 174 when the eyelid image 176 is drooping on the outer eye corner side. FIG. 9C is a so-called "drooping eye". In FIG. 9D too, the eyelid image 176 is drooping on the outer eye corner side, though to a lesser extent than in FIG. 9C. Also, in FIG. 9E, a lower eyelid 180 is displayed in addition to the eyelid image 176. A portion resembling a bag below the eye can also be represented by the image of the lower eyelid 180.

By causing features of an owner to be reflected in the size and color of the pupil image 164, the angle and form of the eyelid image 176, and the like, a face resembling a user can be represented. For example, when an owner has eyes that slant downward, the eye generating unit 152 lowers the fixed position of the eyelid image 176, as in FIG. 9C and FIG. 9D. When an owner has double eyelids, the eye generating unit 152 changes the eyelid image 176 to a double eyelid image. Features of an owner are also reflected in the length and number of the eyelash 178 of the eyelid image 176.

Figure 10:
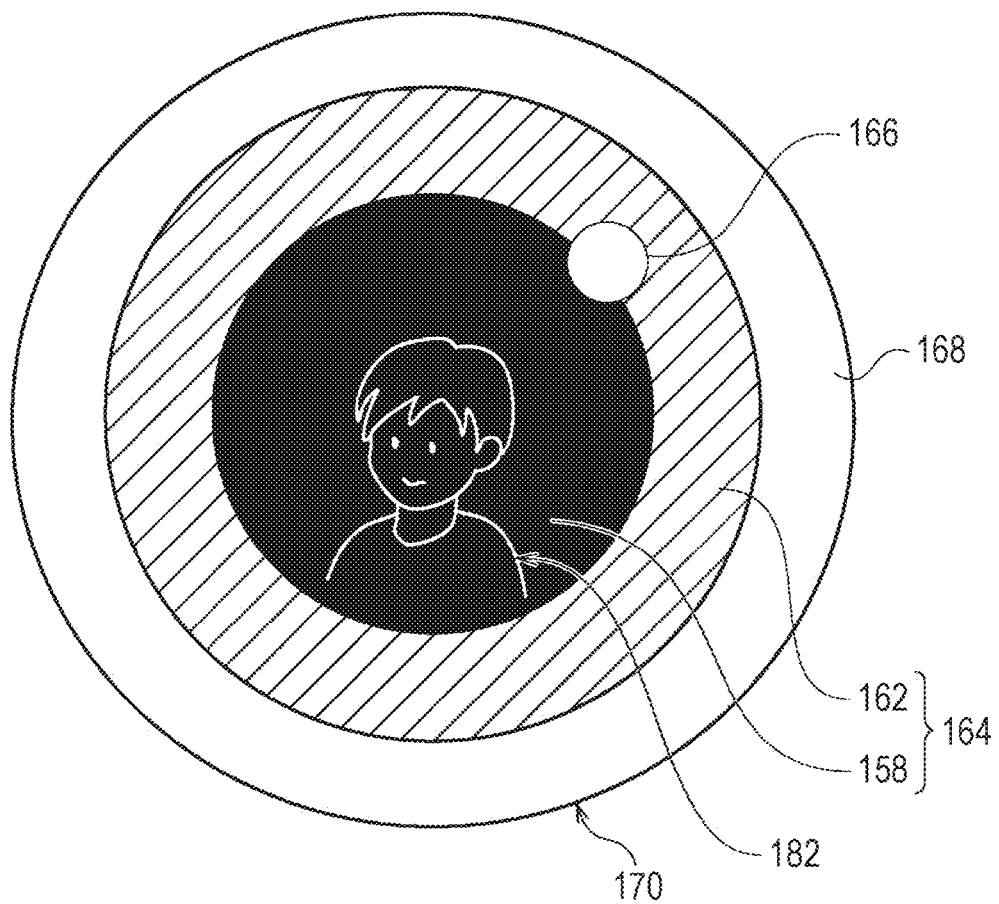
FIG. 10 is an external view of the eye image when displaying a reflection.

FIG. 10 is an external view of the eye image 174 when displaying a reflection.

The eye generating unit 152 causes a subject 182 filmed by the camera 134 to be displayed superimposed on the pupil image 164. By so doing, an aspect wherein an object the robot 100 is looking at is reflected in the pupil image 164, particularly the pupillary region 158, is represented. By actively causing the subject 182 to be displayed in the pupil image 164, the appearance of the eye 100 can be improved. The eye generating unit 152 may cause the subject 182 to be displayed distorted in the pupil image 164 as though seen with a fisheye lens. When adopting this kind of distorted display, the eye image 174 can be caused to appear to be of a curved form, in the same way as an eyeball.

Figure 11:
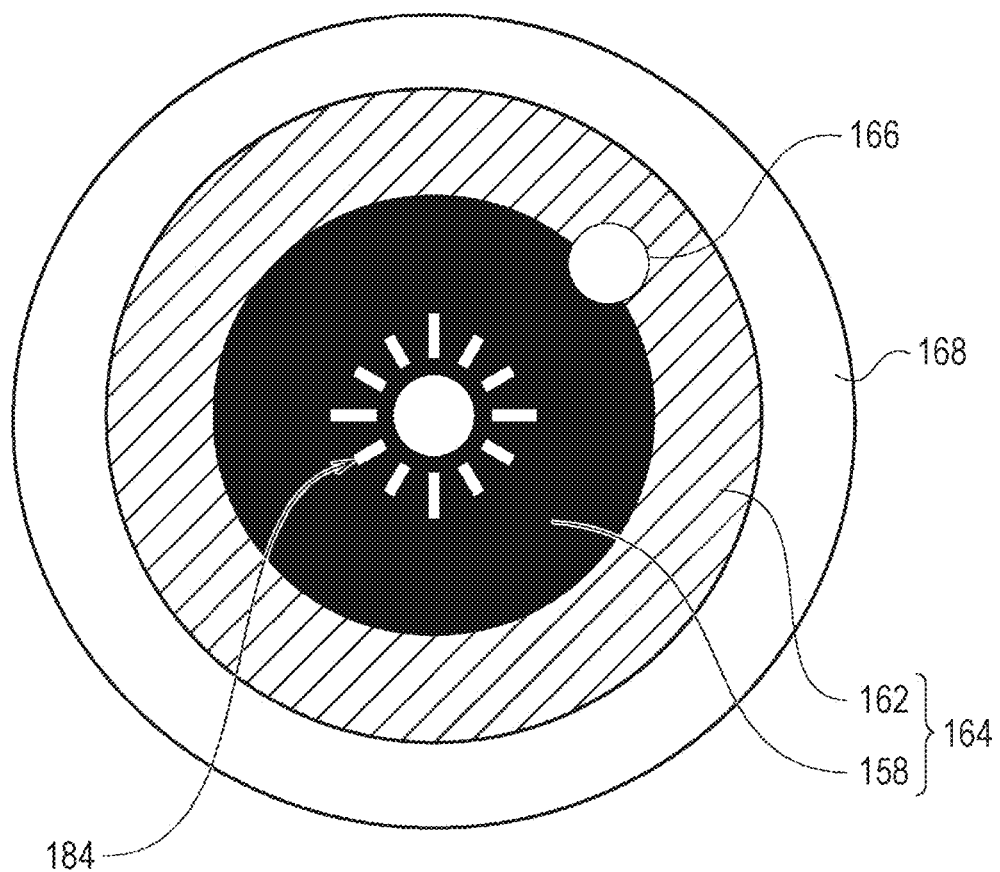
FIG. 11 is an external view of the eye image when an icon is displayed superimposed on a pupillary region.
Figure 12:
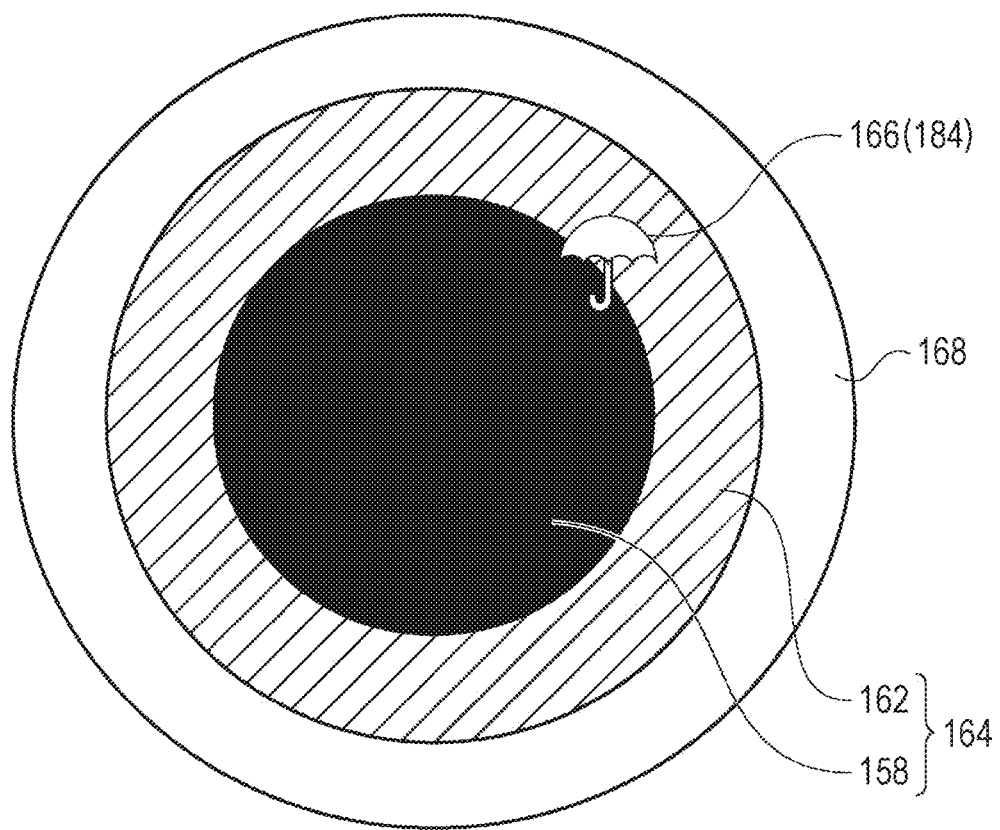
FIG. 12 is an external view of the eye image when a catch light is changed to an icon.

FIG. 11 is an external view of the eye image 174 when an icon 184 is displayed superimposed on the pupillary region 158. FIG. 12 is an external view of the eye image 174 when the catch light 166 is changed to the icon 184.

When a predetermined display condition is satisfied, the eye generating unit 152 causes the icon 184 to be displayed in the pupillary region 158 or the catch light 166. For example, when it is sunny, the icon 184 indicating sunshine is displayed superimposed on the pupillary region 158 (refer to FIG. 11). By looking into the pupillary region 158, a user can confirm that it is sunny outside. The icon 184 may indicate future weather (a weather forecast) rather than current weather.

The icon 184 may be displayed in the pupillary region 158, or the catch light 166 may be caused to change to the icon 184. In FIG. 12, the catch light 166 is changed to the icon 184 indicating rain.

Provided that a display condition of any icon 184 is satisfied when a sight line toward the robot 100 is detected by the sight line detecting unit 140, the eye generating unit 152 causes that icon 184 to be displayed. A configuration may be such that the eye generating unit 152 causes the icon 184 to be displayed when a sight line is detected for a predetermined time or longer, that is, when a stare is detected.

The sight line detecting unit 140 may determine that a user is looking at the robot 100 when both eye regions can be detected in a face image of a size of a certain value or greater. When the state of looking continues for a predetermined time, it is determined that there is a "stare", and the eye generating unit 152 may display the icon 184 so as to be faint, dull, or small. Further, when the state of looking continues longer, the eye generating unit 152 may display the icon 184 so as to become gradually darker, brighter, or larger.

A voice of a user is recognized by a voice recognizing unit (not shown), and the eye generating unit 152 may cause the icon 184 responding to the voice to be displayed. For example, when asked "how's the weather?" by a user, the eye generating unit 152 may cause the icon 184 indicating the current weather to be displayed in response to the keyword "weather". When asked "what will the weather be like tomorrow?" by a user, the eye generating unit 152 may cause the icon 184 indicating the following day's weather to be displayed in response to the keywords "tomorrow" and "weather". When asked "aren't you hungry?" by a user, the eye generating unit 152, recognizing the meaning of "hungry", may cause an indicator image indicating the charging rate of the battery 118 to be displayed as the icon 184. A configuration may be such that the eye generating unit 152 causes the relevant icon 184 to be displayed on condition that one of various kinds of utterance is made when a stare has continued for a predetermined time.

The eye generating unit 152 deletes the icon 184 when a predetermined time elapses. Alternatively, the eye generating unit 152 may delete the icon 184 on condition that a stare from a user is no longer detected. The icon 184 may be deleted over time using a fade-out method.

The eye generating unit 152 may cause the icon 184 to be displayed at an arbitrary timing, randomly for example, or may always cause the icon 184 to be displayed when a display condition is satisfied. Also, the eye generating unit 152 may regularly execute a "blinking display" that closes the eyelid image 176, and cause the icon 184 to be displayed in accordance with the blinking timing.

Heretofore, the robot 100 and the robot system 300 including the robot 100 have been described based on an embodiment.

According to the embodiment, the eye 110, which expresses individuality with regard to the external appearance of the robot 100, can be caused to resemble an owner's eye. As the eye 110 of the robot 100 comes to resemble his or her own eye, the owner is liable to feel a sense of closeness to the robot 100. Also, of a multiple of owners, the eye 110 of the robot 100 comes to resemble an owner with high familiarity, because of which the quantitative value familiarity can be qualitatively suggested using the eye image 174. Because of this, a desire to be on good terms with, and be liked by, the robot 100 is aroused in the owner.

Also, as the eye 110 changes with age, growth and aging of the robot 100 can be represented using the eye 110. Because of this, an owner is liable to maintain affection toward the robot 100 with which the owner spends a long time.

When filming a person, there is a technique whereby a catch light is caused to be reflected in an eye using a stroboscope or the like. A catch light has an effect of causing a human eye to appear vivacious. The robot 100 in the embodiment is such that the eye generating unit 152 actively causes an image of the catch light 166 to be displayed as one portion of the eye image 174. Originally, a catch light is a reflection of external light (reflected light), but in the case of the robot 100, cuteness of the eye 110 of the robot 100 is emphasized by causing the catch light 166 to be displayed.

The eye generating unit 152 causes the position of the catch light 166 to change in accordance with the direction of an external light source, because of which a realistic image with no incongruity can be represented. The eye generating unit 152 causes the size of the pupillary region 158 to change in accordance with light intensity, whereby the eye 110 like that of a living being can be represented. By representing a reflection by displaying the subject 182 superimposed on the eye image 174, the appearance of the eye 110 of the robot 100 is improved. Controlling the blinking frequency and timing also contributes to the sense of realism of the eye 110.

The robot 100 in the embodiment has non-verbal communication as a basic concept. Meanwhile, the robot 100 can also be caused to function as an information terminal. According to the embodiment, various items of useful information, such as the weather and the charging rate, can be communicated as the icon 184 using the eye image 174. The robot 100 also functions as an information terminal of use to a user, while adhering to a basic concept of being non-verbal and sensitive.

It is thought that by configuring so that the icon 184 is displayed as though floating up only when a user looks closely at the robot 100, the user will become keen to look closely at the robot 100. When an owner looks closely at the robot 100 at close range, the camera 134 easily extracts a feature vector of the owner. Increasing opportunities for an owner to look closely at the robot 100 is also effective in increasing accuracy of the user identification process.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

The eye generating unit 152 may control the eyelid image 176 in accordance with a time band or the internal state of the robot 100. For example, the eyelid image 176 may descend when the charging rate decreases, and the eyelid image 176 may descend completely, closing the eye, during charging. When it is late at night, "sleepiness" may be expressed by lowering the eyelid image 176.

The eyelid image 176 in the embodiment is formed as one portion of the eye image 174. As a modified example, the eyelid image 176 and the lower eyelid 180 may be formed as physical covers covering the monitor 170.

When the parameter indicating loneliness reaches a predetermined threshold or greater, features of the mother may be reflected, and when the parameter indicating curiosity reaches a predetermined threshold or greater, features of the father may be reflected. Feature quantities of an owner's eye may be acquired divided by situation. For example, the feature extracting unit 146 may separately acquire a feature quantity of the eye when the owner P1 is laughing and a feature quantity of the eye when the owner P1 is sad.

An amount of change (a difference) between the feature quantity of the eye when laughing and a feature quantity of the eye at a normal time is taken to be a feature quantity change A, and an amount of change (a difference) between the feature quantity of the eye when sad and the feature quantity of the eye at a normal time is taken to be a feature quantity change B. Also, the feature quantity change A of the owner P1 is assumed to be greater than the feature quantity change A of the owner P2. Meanwhile, the feature quantity change B of the owner P2 is assumed to be greater than the feature quantity change B of the owner P1. In this case, the eye generating unit 152 may cause features of the owner P2 to be reflected when the parameter indicating loneliness reaches the predetermined threshold or greater, and may cause features of the owner P1 to be reflected when a parameter indicating pleasure reaches a predetermined threshold or greater. When in an emotional state of happiness, the robot 100 resembles the owner P1, whose smiling face is characteristic. Also, when in an emotional state of loneliness, the robot 100 resembles the owner P2, whose sad face is characteristic. According to this kind of control method, a characteristic expression of an owner can be synchronized with an emotional state of the robot 100.

The eye generating unit 152 may select an owner that is to be a target of reflective change in accordance with various kinds of internal state such as the charging rate, the processing load of the processor 122, or the internal temperature of the robot 100, or an external state such as when light intensity is of a predetermined value or greater, when it is 10 o'clock at night or later, or the weather. According to this kind of control method, an owner can be caused to feel that the robot 100 somehow resembles him or herself only when in a specific state. Also, it is thought that as features of each of a multiple of owners can be incorporated in the robot 100, a large number of owners are liable to feel a sense of closeness to the robot 100.

When there are a multiple of owners, the eye generating unit 152 may cause features of the multiple of owners to be reflected in the eye 110 by taking a weighted average of feature vector components of each owner based on the familiarity with respect to each owner.

It is often the case that a human's eyes differ in form between left and right. In the case of the robot 100 too, features of an owner's right eye may be reflected in the right eye 110, and features of an owner's left eye may be reflected in the left eye 110.

The eye generating unit 152 may express bleariness of the eye 110 by shaking or blurring the catch light 166 or the pupillary region 158.

Three kinds of process are included in a reflective change, those being a first process of selecting an owner that is to be a target of the reflective change, a second process of extracting features of the selected owner, and a third process of causing the features of the selected owner to be reflected in the eye image 174. The second process is executed after the first process is completed, and the third process is executed over time after the second process is completed.

The eye generating unit 152 may start a reflective change of the eye image 174 immediately after the robot 100 is introduced into the home. For example, the eye generating unit 152 may select the first owner recognized after the robot 100 is introduced into the home and the power supply is turned on as the target of the reflective change (first process). Alternatively, a predetermined grace period until the eye generating unit 152 starts a reflective change may be set. The grace period is one kind of observation period secured for the first process of the robot 100 selecting an owner that is to be a target of a reflective change. After the grace period elapses, the eye generating unit 152 may start a reflective change with any owner as the target. For example, when familiarity with respect to any owner reaches a predetermined threshold or greater, the eye generating unit 152 may adopt that owner as the target of the reflective change. In this case, a period until the familiarity exceeds the threshold is the grace period. The grace period may also be a constant time.

The eye generating unit 152 may record the date and time of the power supply first being turned on after the robot 100 is introduced into the home. Alternatively, a timer may be caused to start when the power supply is first turned on. Not being limited to the power supply being turned on, it is sufficient that the date and time at which a predetermined trigger event occurs is recorded as a standard date and time. Based on this kind of time information, the eye generating unit 152 may cause a temporal change in the eye image 174.

A multiple of display layers may be included in the eye 110 of the robot 100. Specifically, a first layer (a display surface of the eye image 174) on which a three-dimensional object representing an eyeball is projected, a second layer on which the icon 184 is displayed, and a third layer on which the eyelid image 176 is displayed are stacked, and a fourth layer on which special information is displayed may be formed in an uppermost layer (external side). Special information in this case is information of which there is a high necessity to notify a user, such as a remaining battery charge being at a predetermined value or lower, or a system error occurring, or information of which notification requires urgency, and is defined by a designer of the robot 100. The icon 184 may be displayed on the first layer (deepest layer) rather than the second layer by displaying the icon 184 on the pupil image 164 of the three-dimensional object.

Multiple kinds of "temperament" may be set in advance in the robot 100. As an aging change, the eye generating unit 152 of the robot 100 with a temperament A may cause the eyelid image 176 to gradually change to a drooping eye, and the eye generating unit 152 of the robot 100 with a temperament B may cause the eyelid image 176 to gradually change to a slanting eye. In this way, an aging change pattern may be determined based on a congenital setting of the robot 100.

Also, the eye image 174 may be caused to undergo an aging change in accordance with an environment or experience of the robot 100. For example, an aging change pattern of the eye image 174 may be determined in accordance with whether the robot 100 has experienced more pleasant actions or unpleasant actions. The eye generating unit 152 may select one of multiple kinds of aging change pattern in accordance with conditions such as an owner with familiarity of a first threshold or greater being present, a multiple of owners with familiarity of a second threshold or greater being present, and no owner with familiarity of a third threshold or less being present. As one example, the eye generating unit 152 of the robot 100 that has experienced more pleasant actions than unpleasant actions causes the eyelid image 176 to change to a drooping eye, and causes the pupillary region 158 to change to be larger than an initial setting. Meanwhile, the eye generating unit 152 of the robot 100 that has experienced more unpleasant actions than pleasant actions may cause the eyelid image 176 to change to a slanting eye, and cause the pupillary region 158 to change to be smaller than the initial setting.

The eye generating unit 152 may cause the emotional state of the robot 100 to be reflected in the eye image 174. For example, when the robot 100 is in a certain emotional state (for example, surprised), the eye generating unit 152 may represent an aspect of "opening the eyes wide" by enlarging the pupillary region 158, and when the robot 100 is in a different emotional state (for example, agitated), the eye generating unit 152 may increase the blinking frequency. The eye generating unit 152 may cause the eye image 174 to change when blinking, in the same way as the icon 184. According to this kind of control method, an owner can perceive an emotion of the robot 100 from the eye image 174 of the robot 100. In this way, the eye generating unit 152 not only causes an aging change or a reflective change of the eye image 174, but may also cause a transient change of the eye image 174 in accordance with an emotional state.

The eye generating unit 152 may cause the eye image 174 to change in accordance with a location of the robot 100. For example, when the robot 100 exists at a favored point on the emotion map 116, the eye generating unit 152 may represent an aspect of "opening the eyes wide" by enlarging the pupillary region 158, and when the robot 100 exists at a disliked point, the eye generating unit 152 may represent an aspect of "being restless" by raising the blinking frequency. In this way, an emotion of the robot 100 with respect to a place may be expressed using the eye image 174.

When displaying a reflection too, the eye generating unit 152 may change the display of the subject 182 to be darker, larger, and more distinct the longer a staring state continues.

The eye generating unit 152 may project a filmed image unchanged onto the pupil image 164, or may project the filmed image after carrying out a processing thereon. For example, when a focal point of a filmed image is blurred, the eye generating unit 152 may generate an image of a sharper subject 182 after performing an already-known image correction such as high-pass filtering.

The eye generating unit 152 may save a multiple of filmed images in advance in connection with one user, and when an appropriate filmed image cannot be obtained for a reason such as the user being too close, the eye generating unit 152 may display a saved filmed image as a reflection in the pupil image 164 instead of an actual filmed image. According to this kind of processing method, an appropriate image of the subject 182 can be displayed as a reflection, even when an image filmed by the camera 134 is out of focus. Also, when displaying a reflection by substituting with a saved filmed image, the filmed image may be enlarged or reduced in accordance with the distance between the robot 100 and the user. When the robot 100 and the user are particularly close, the user may be filmed using a close-up camera.

When a predetermined reset button installed in the robot 100 is pressed, or when a predetermined reset command is transmitted from the server 200 to the robot 100, the eye generating unit 152 may reset a constant change. When a reset is executed, the eye generating unit 152 clears an aging change or a reflective change, thereby changing the eye image 174 to the eye image 174 at the time of shipping from the factory. By resetting, the eye image 174 may be returned to, for example, the eye image 174 of a predetermined point several days before or several weeks before. In this case, the eye generating unit 152 needs to save chronological information of the constant change of the eye image 174. According to this kind of reset function, the eye image 174 can be "rewound" to the eye image 174 of several days before or several weeks before, even when the eye image 174 does not make a preferred constant change. A reset may be executed by an owner at an arbitrary timing, a quantity limit may be provided, or a reset authority may be limited by a password or the like.

After resetting too, there is a possibility of the eye image 174 of the robot 100 making the same constant change as the previous time when the external environment of the robot 100 does not change. As a modified example, a user may be able to set a change tendency of the eye image 174. For example, when a "dignified" change tendency is selected, the eye image 174 may be such that a lowering of the eyelid image 176 is restricted. When a "cute" change tendency is selected, the eye image 174 may be such that the eyelash 178 is set to be longer than normal, and the diameter of the pupil image 164 is increased in comparison with a normal time. A user may instruct using a voice, or may instruct via an operating unit installed in the robot 100 or the server 200.

A speed of a constant change (aging change or reflective change) may be variable. For example, the operation control unit 150 may increase the speed of an aging change for a period shortly after the purchase of the robot 100, and reduce the speed of the aging change after a predetermined period elapses. According to this kind of control method, growth and aging resembling that of a living being can be expressed in that the eye image 174 is liable to change when the robot 100 is "young", and the eye image 174 stabilizes when the robot 100 becomes "mature".

The robot system 300 does not need to include a function of causing an eye image to change from the time of shipping from the factory. Functional strengthening of the robot system 300 after the robot system 300 is shipped may be realized by downloading an eye image control program that realizes an eye image control function via a communication network.

The following combinations of the features are encompassed by one or more embodiments of the subject matter described in the present specification.

A robot, comprising:
a non-transitory computer readable medium configured to store instructions thereon;
a display in a face region of the robot;
a sensor configured to capture an image of a user; and
a processor connected to the non-transitory computer readable medium, wherein the processor is configured to execute the instructions for:
   extracting a feature quantity of an eye of the user from the captured image;
   managing an internal state of the robot;
   generating an eye image, wherein generating the eye image comprises determining whether to reflect the feature quantity of in the eye image based on the internal state;
   instructing the display to display the eye image.

The robot according to the above combinations, wherein the internal state comprises familiarity with respect to a user.

A robot, comprising:
a non-transitory computer readable medium configured to store instructions thereon;
a display in a face region of the robot; and
a processor connected to the non-transitory computer readable medium, wherein the processor is configured to execute the instructions for:
   generating an eye image, wherein generating the eye image comprises changing an apparent age of the eye image based on a surrounding environment; and
   instructing the display to display the eye image.

The robot according to the above combination, wherein the processor is configured to execute the instructions for:

extracting a feature quantity of an eye of a user from a captured image of the user, and changing the apparent age of the eye image based on the feature quantity of the eye of the user.

A robot, comprising:

a camera;

a non-transitory computer readable medium configured to store instructions thereon;

a display in a face region of the robot; and a processor connected to the non-transitory computer readable medium, wherein the processor is configured to execute the instructions for:

detecting a line of sight of a user based on an image from the camera;

generating an eye image, wherein the image from the camera is superimposed on the eye image in response to the detected line of sight being directed toward the robot;

instructing the display to display the eye image.

What is claimed is:

1. A robot, comprising:
a non-transitory computer readable medium configured to store instructions thereon;
a display in a face region of the robot;
a processor connected to the non-transitory computer readable medium and to the display, wherein the processor is configured to execute the instructions for:
extracting a feature quantity of an eye of a user from a captured image of a user;
generating an eye image, wherein generating the eye image comprises:
setting an observation period,
selecting the user from the observation period, and
generating the eye image to be reflective of the extracted feature quantity following elapse of the observation period; and
instructing the display to display the eye image.

2. The robot according to claim 1, wherein the processor is configured to execute the instructions for causing a size of a pupil image included in the eye image to change.

3. The robot according to claim 1, wherein the processor is configured to execute the instructions for causing a form of an eyelid image, included in the eye image, to change.

4. The robot according to claim 1, wherein the processor is configured to execute the instructions for causing an operation pattern of the eye image to change.

5. The robot according to claim 1, further comprising:
a detector configured to detect an external light, wherein the processor is configured to execute the instructions for:
causing a size of a pupil image, included in the eye image, to change in accordance with an intensity of the detected external light, and
causing a form of an eyelid image, included in the eye image, to change in response to the intensity of the detected light exceeding a threshold.

6. A robot, comprising:
a non-transitory computer readable medium configured to store instructions thereon;
a display in a face region of the robot;
a detector configured to detect an external light source; and
a processor connected to the non-transitory computer readable medium, wherein the processor is configured to execute the instructions for:
generating an eye image, wherein the eye image comprises a catch light, and generating the eye image comprises:
setting a position of the catch light based on a direction of the detected external light source relative to the robot, and
setting a size of a distortion of the catch light based on the position of the catch light; and
instructing the display to display the eye image.

7. The robot according to claim 6, wherein the processor is configured to execute the instructions for causing a size of the catch light to change in accordance with a detected intensity of the detected external light source.

8. A robot, comprising:
a non-transitory computer readable medium configured to store instructions and a plurality of icons thereon;
a display in a face region of the robot; and
a processor connected to the non-transitory computer readable medium, wherein the processor is configured to execute the instructions for:
selecting an icon from the plurality of icons in response to satisfying of a predetermined condition;
generating an eye image;
superimposing the selected icon on the eye image in response to satisfying the predetermined condition; and
instructing the display to display the eye image and the superimposed icon.

9. The robot according to claim 8, wherein the processor is configured to execute the instructions for:
detecting a sight line of a user; and
superimposing the selected icon on the eye image in response to the detected sight line being directed toward the robot.

10. The robot according to claim 8, wherein the processor is configured to execute the instructions for generating the eye image comprising a catch light.

11. The robot according to claim 10, wherein the processor is configured to execute the instructions for causing a size of the catch light to change in accordance with a detected intensity of a detected external light source.

12. The robot according to claim 10, wherein the processor is configured to execute the instructions for changing the catch light to the icon in response to satisfying the predetermined condition.

13. The robot according to claim 8, wherein the processor is configured to execute the instructions for superimposing the icon on the eye image at a timing of executing a blinking of the eye image.

14. The robot according to claim 8, wherein the predetermined condition is an ambient environment condition.

15. The robot according to claim 8, wherein the predetermined condition is a charging rate of a battery of the robot.

* * * * *